J. H. KELLY.
SAFETY CONNECTION FOR SHAFT COLLARS AND THE LIKE.
APPLICATION FILED SEPT. 22, 1909.
959,752.
Patented May 31, 1910.
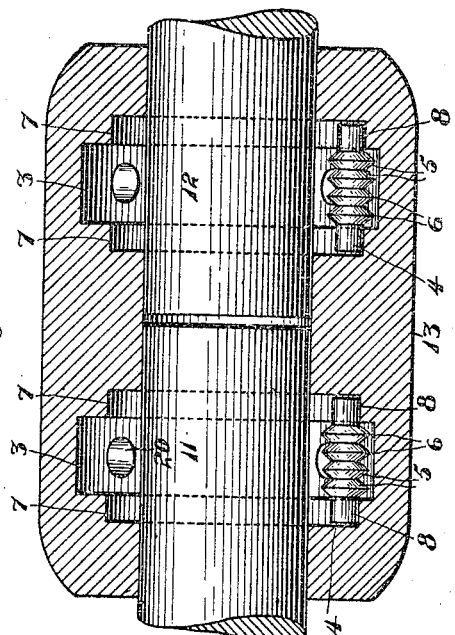
WITNESSES:
F. C. Fliedner
N. B. Keating
INVENTOR
J. H. Kelly,
BY
F. M. Wright,
ATTORNEY

UNITED STATES PATENT OFFICE.

JOHN H. KELLY, OF SAN FRANCISCO, CALIFORNIA.

SAFETY CONNECTION FOR SHAFT-COLLARS AND THE LIKE.

959,752.     Specification of Letters Patent.    Patented May 31, 1910.

Application filed September 22, 1909. Serial No. 519,010.

*To all whom it may concern:*

Be it known that I, JOHN H. KELLY, a citizen of the United States, residing at San Francisco, in the county of San Francisco and State of California, have invented new and useful Improvements in Safety Connections for Shaft-Collars and the Like, of which the following is a specification.

The present invention relates to means for securing a collar upon a shaft or a coupling upon two shafts without the necessity of using projecting parts such as the heads of set screws.

Serious and sometimes fatal bodily injuries occur to workmen and others coming into proximity with rotating shafts, by reason of their clothing being caught by the head of the set screw which is used to secure upon the shaft a collar or a coupling.

The object of the present invention is to avoid such accidents.

In the accompanying drawing, Figure 1 is a broken side view of my invention, as used for a collar; Fig. 2 is a cross-sectional view of the same; Fig. 3 is a view, similar to Fig. 1, of a modified form of the invention; Fig. 4 is a view, similar to Fig. 1, showing the invention used for a coupling.

Referring to the drawing, upon a shaft 1 is passed a collar or shell 2, fitting snugly on the shaft and which is then moved to the position upon the shaft suitable for the purpose for which it is intended. The interior of said collar is formed with a chamber 3, in which, between the collar 2 and the shaft 1, can travel a roller 4. Said roller is formed with a suitable number, four being here shown, of rings or enlargements 5, having sharp edges 6. Said roller travels on a path eccentric to the collar and to the shaft, which path may consist either of two smooth tracks 7, upon which the smooth ends 8 of the roller travel, as shown in Figs. 1 and 2, or of a single track 9, upon which a central smooth portion 10 of the roller travels, as shown in Fig. 3. In both cases the tracks are eccentric to the shaft and collar. Before placing the collar upon the shaft, the collar is turned so that the part of the eccentric track or tracks most remote from the center of the collar is at the bottom, in order that the roller 4, which naturally rolls to the bottom, may be in such a position that the upper part of its cutting edges will not be in the way of the shaft when the collar is placed thereon. After the collar has been thus placed upon the shaft, it is turned thereon, the effect of which is to cause the bottom of the eccentric track to approach more and more nearly to the shaft, thereby causing the cutting edges to approach the shaft, so that, by a continued advance of the collar around the shaft, said cutting edges finally engage or bite said shaft, so that the collar cannot be moved longitudinally thereon.

In Fig. 4 the invention is applied to form a coupling for two shafts, shown at 11 and 12. The collar 13 is now made with two chambers instead of one, one for each shaft, there being a roller in each chamber, but the operation is in other respects the same, namely, the collar, having been placed in position over the two shafts, is rotated until, by means of the eccentric paths for the rollers, the cutting edges of said rollers are caused to bite the shaft.

I claim:—

In combination with a shaft, a shell fitting closely around the shaft and formed with an internal chamber and with a track within the chamber eccentric to said shaft, and a roller parallel with the shaft and having a part arranged to roll upon said track and a part formed with a circumferential cutting edge arranged to engage said shaft when brought into contact therewith by the movement of said roller on said eccentric track, substantially as described.

In testimony whereof I have hereunto set my hand in the presence of two subscribing witnesses.

JOHN H. KELLY.

Witnesses:
 FRANCIS M. WRIGHT.
 D. B. RICHARDS.